United States Patent [19]

Flynt

[11] 4,060,328

[45] Nov. 29, 1977

[54] SYSTEM FOR MEASURING THE MODULATION TRANSFER FUNCTION OF AN OPTICAL DEVICE

[75] Inventor: William E. Flynt, Garland, Tex.

[73] Assignee: Varo, Inc., Garland, Tex.

[21] Appl. No.: 655,905

[22] Filed: Feb. 6, 1976

[51] Int. Cl.² ............................................. G01B 9/00
[52] U.S. Cl. .................................................. 356/124
[58] Field of Search ........................................ 356/124

[56] References Cited

U.S. PATENT DOCUMENTS

| 2,773,413 | 12/1956 | Schade, Sr. | 356/124 |
| 3,743,427 | 7/1973 | Weiser | 356/124 |

OTHER PUBLICATIONS

Murata, Kazumi; Instruments for the Measuring of Optical Transfer Functions; *Progress In Optics*, vol. V., ed. Wolf pp. 211, 212, 1966.

*Primary Examiner*—Conrad L. Clark
*Attorney, Agent, or Firm*—Olson, Trexler, Wolters, Bushnell & Fosse, Ltd.

[57] ABSTRACT

A slit image is projected through the optical device being measured and onto the optical input screen of a variable-gain photomultiplier tube. Before it is incident upon the input screen of the tube, the projected image is modulated to develop simultaneously a low-frequency image component and one or more higher-frequency image components. Electronic filters are employed to separate the electrical output signal of the photomultiplier tube into discrete electrical signals each representative of a different one of the image components, and one or more meters are used to indicate the relative amplitudes thereof. A phase-locked-loop detector and an amplifier are employed between each filter and meter to improve the signal-to-noise ratio of the system and increase the signal amplitude to a level suitable for driving the meter. In one embodiment, the overall gain of the system is manually adjusted until the meter reads 100 percent MTF for the low-frequency component. A normalized MTF measurement at each of the higher frequencies is indicated either on the same meter, by using a switch, or on a separate meter for each frequency. In another embodiment, a closed-loop feedback circuit comprising a comparator circuit which compares the amplitude of the low-frequency electrical signal with that of a reference signal and generates an error signal which is coupled to the photomultiplier tube to automatically adjust the system such that a 100 percent MTF reading is obtained for the low-frequency component throughout the entire time that the optical device is being measured.

23 Claims, 10 Drawing Figures

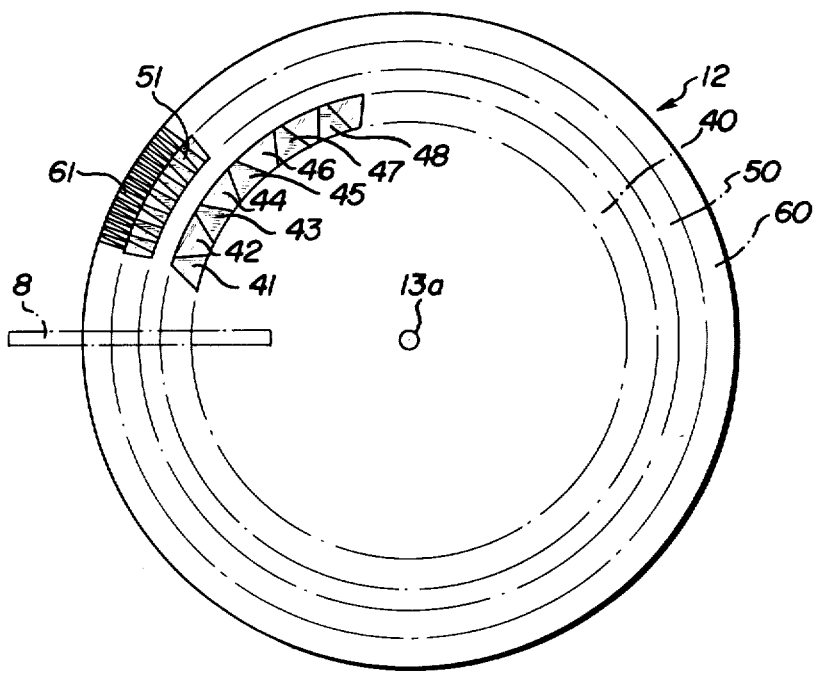
FIG. 2
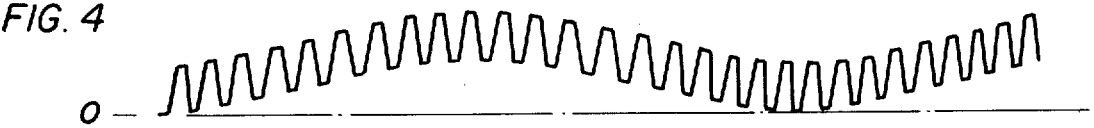
FIG. 4
FIG. 3
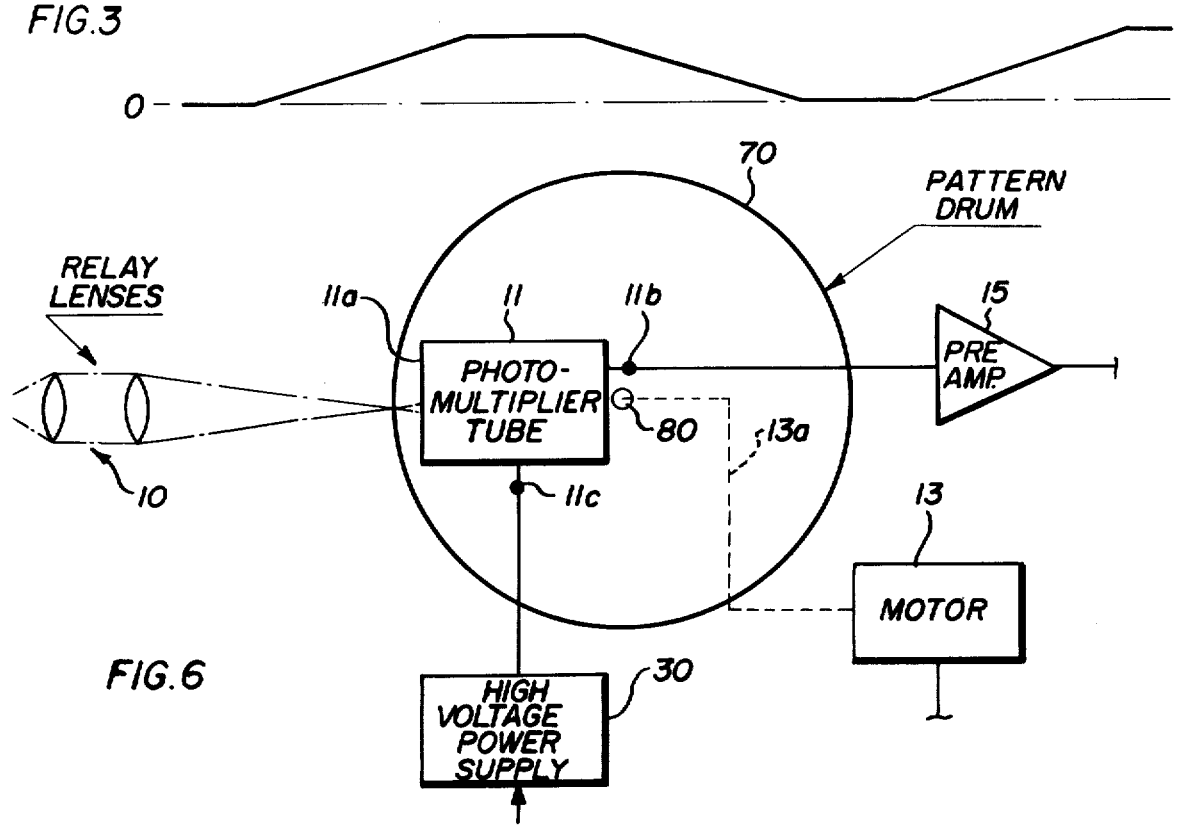
FIG. 6

RATIO OF TRANSPARENT AREAS TO OPAQUE AREAS IS 1.5 TO 1 ←→ RATIO OF TRANSPARENT AREAS TO OPAQUE AREAS IS 0.67 TO 1 (1 TO 1.5)

SYSTEM FOR MEASURING THE MODULATION TRANSFER FUNCTION OF AN OPTICAL DEVICE

BACKGROUND OF THE INVENTION

This invention generally relates to a system for measuring the modulation transfer function of optical systems such as image intensifier tubes and, more particularly, to improved means for normalizing such apparatus either manually or automatically.

In recent years, the image-forming quality of an optical device such as a lens or an image intensifier tube has been quantitatively by determining its light transmission efficiency at a selected spatial frequency. This newer method reduces the imprecision of the more conventional, subjective evaluation of having a technician observe the degree of resolution of an image formed by the optical device being examined. The quantitative measurement is typically referred to as the "modulation transfer function" (MTF) and it is expressed as a percentage at a given spatial frequency. For example, if a lens has an MTF of 75 percent at a spatial frequency of 100 line pairs per millimeter, that measurement means that 75 percent of the image information was passed by the lens and 25 percent of the image information was lost at that spatial frequency. Similarly, an image intensifier tube having an MTF of 85 percent at 7.5 line pairs per millimeter transmits 85 percent of the image information at that frequency and loses 15 percent.

Various devices have been proposed for attempting to measure modulation transfer function but they have encountered difficulties with speed, reliability, and accuracy. One particular shortcoming of conventional MTF measuring apparatus has been the inability to conveniently establish an absolute 100 percent MTF reference level so that, in measuring a series of similarly constructed lenses, for example, a meaningful set of MTF measurements could be obtained for the entire batch of lenses. For instance, calibration of the system disclosed in U.S. Pat. No. 3,743,427 to Weiser is accomplished by using an optical chopper and is limited, in a practical sense, to normalization only during periods when measurements are not being taken. Thus, such factors as variations in the level of background illumination and the stability of the electrical components involved during the time that the device is being measured may vary the measured value of the modulation transfer function. On the other hand, the device of U.S. Pat. No. 3,438,713 to Heynacher et al. uses the lowest spatial frequency in a series of modulated frequencies as a relative point and hence is unable to provide an absolute calibration of modulation transfer function. U.S. Pat. No. 3,489,497 to Bigelmaier uses the DC component of the photomultiplier output signal for selected spatial frequencies to regulate the sensitivity of the system. Not only is the DC system subject to bias drifts and generally more complicated than an AC system, but it does not provide an absolute MTF measurement. A somewhat cumbersome compensation system is provided by U.S. Pat. No. 3,447,874 to Back which uses an open-loop compensation system for the normalization of gain, including a number of potentiometers which are switched into and out of the circuit by a mechanical switch attached to the frequency selector (a zoom lens).

It is therfore a general object of this invention to provide a new and improved system for measuring the modulation transfer function of an optical device.

It is a further object of the present invention to provide such a system which has means for normalizing the measurements to obtain absolute MTF values at one or more spatial frequencies.

It is another object of the invention to provide such normalization automatically and continuously throughout the duration of the evaluation of the optical device under test.

SUMMARY OF THE INVENTION

A system constructed in accordance with the invention for determining the image-forming quality of an optical device, by projecting an image through the device and measuring the relative amount of light transmitted therethrough at a plurality of spatial frequencies, comprises photoelectric transducer means, including an optical input section and an electrical output section, for converting a light signal incident upon the input section into a corresponding electrical signal at the output section. Projection means are provided for projecting the image along a path through the optical device and onto the optical input section. Modulating means disposed in the projection path are utilized for modulating the projected image to produce simultaneously a low-frequency image component incident upon the optical input section and at least one high-frequency image component incident upon the optical input section. A plurality of filter means respectively tuned to the frequency of each image component and coupled to the electrical output section of the photoelectric transducer means are utilized for developing a corresponding plurality of discrete electrical signals each representative of a different one of the image components. Indicating means are coupled to the filter means for indicating the amplitude of the discrete electrical signals. Normalization means are provided for adjusting the apparatus such that the indicating means indicates a predetermined amplitude for the low-frequency image component, whereby the system is set to a normalized level for the optical device being measured so that the higher-frequency image components are then capable of being measured under a standarized system for measuring the image-forming quality of a series of optical devices at one or more higher spatial frequencies.

BRIEF DESCRIPTION OF THE DRAWINGS

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

FIG. 2 illustrates a pattern which is employed in the modulating means of a preferred embodiment of the invention;

FIGS. 3 and 4 are graphical representations of signals developed by a preferred embodiment of the invention;

FIG. 6 is a block diagram of an alternative embodiment of the image-modulating means of the invention;

DESCRIPTION OF THE PREFERRED EMBODIMENT

Figure 1:
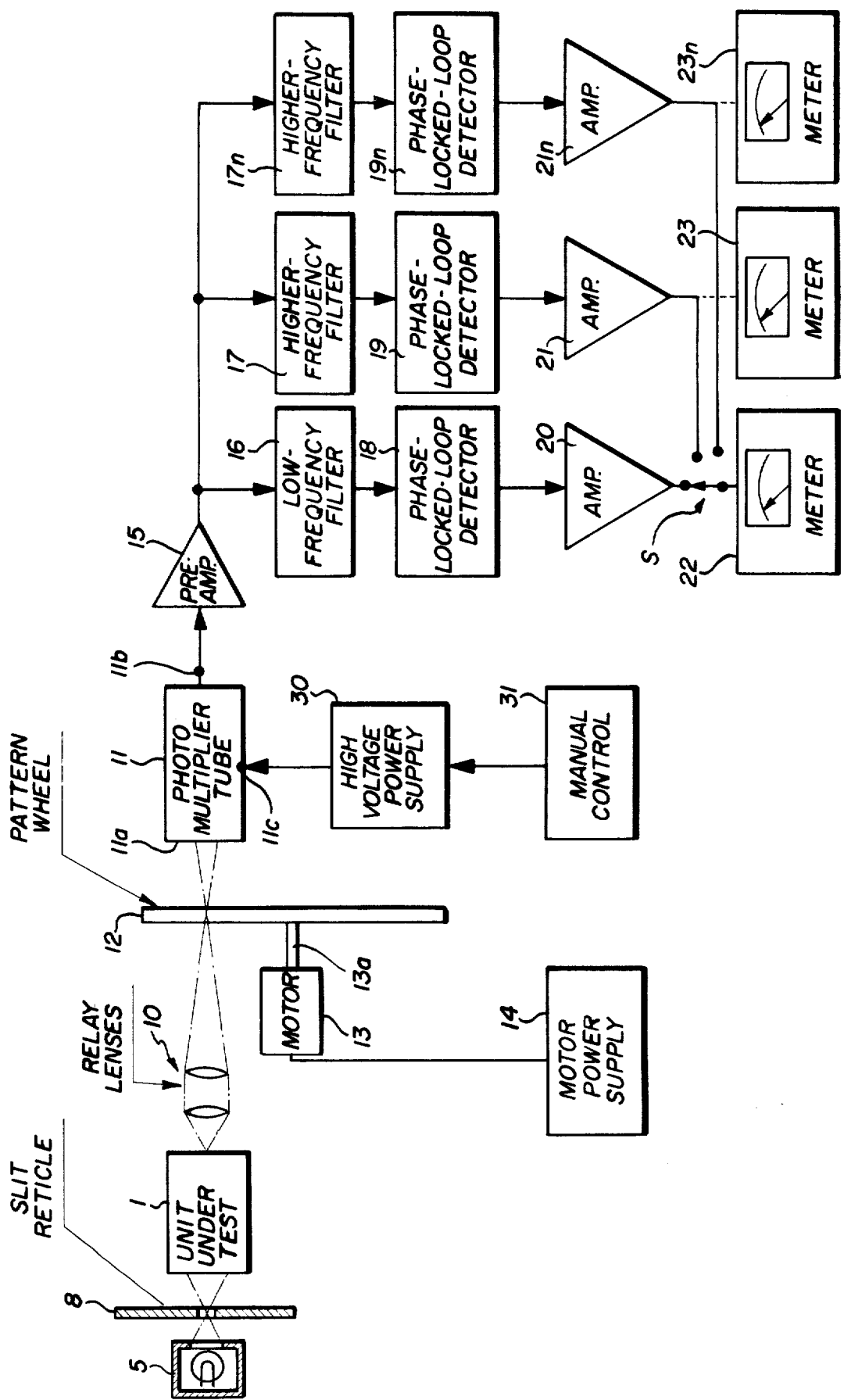
FIG. 1 is a block diagram of a preferred embodiment of the invention in which the normalization is accomplished manually.

With respect to FIG. 1, a preferred embodiment of the invention is shown in block diagram form in which the modulation transmission function (MTF) for an optical device 1 may be measured by a system constructed in accordance with the principles of the present invention.

In general, the embodiment of the invention illustrated in FIG. 1 may be used to determine the image-forming quality of optical device 1 by projecting an image through the device and measuring the relative amount of light transmitted therethrough at a plurality of spatial frequencies. A light source 5 is utilized to project light through a slit reticle 8 to form a slit image which is projected along a path through device 1 and relay lenses 10, which are suitable for focusing the slit image on the plane of a pattern wheel 12. The image is then projected onto an optical input screen 11a of a photomultiplier tube 11. Photomultiplier tube 11 converts the light signal which is incident upon its input section or screen 11a into a corresponding electrical signal at its output section or terminal 11b. A pattern wheel 12 driven by a motor 13, which is energized by a power supply 14, is disposed in the image projection path between photomultiplier tube 11 and relay lenses 10 to produce simultaneously a low-frequency image component incident upon input screen 11a of photomultiplier tube 11 and at least one high-frequency image component incident upon input screen 11a of photomultiplier tube 11, as hereinafter described in greater detail with reference to FIG. 2.

Electronic filters 16, 17, and 17n are respectively tuned to the frequency of each image component and are coupled to output terminal 11b of photomultiplier tube 11 by means of a preamplifier 15 to develop discrete electrical signals each representative of a different one of the image components. Filter 16 is tuned to the low-frequency component; filter 17, and high-frequency component; and filter 17n, another higher-frequency component. Although only three spatial frequencies and corresponding filters are employed in the embodiment of the invention illustrated in FIG. 1, it is understood that any number of spatial frequencies and corresponding filters may be employed as desired. A meter 22 is coupled to filter 16 by means of a phase-locked-loop detector 18, amplifier 20, and a SPTT switch S for selectively indicating the amplitude of the low-frequency signal and the higher-frequency signals. Switch S may be used also to couple meter 22 to filter 17 and 17n by means of detectors 19, 19n and amplifiers 21, 21n, respectively. Alternatively, separate meters 23, 23n may be employed and respectively connected to amplifiers 21, 21n (as indicated by the dashed lines) for continuous indication of the higher-frequency components.

By taking advantage of the fact that, at very low spatial frequencies (e.g., 0.75 line pairs per millimeter), the MTF of an optical device such as an image intensifier tube is 100 percent for most practical purposes, the system is adjusted such that meter 22 indicates an amplitude for the low-frequency image component corresponding to 100 percent MTF, whereby the system is set to a normalized level for optical device 1 so that the higher-frequency image components are then capable of being measured under a standardized system for determining the image-forming quality of a series of optical devices similar to device 1 at one or more higher spatial frequencies.

In the embodiment of the invention illustrated in FIG. 1, adjustment of the apparatus is accomplished by employing a high-voltage power supply 30 utilizing a manual output adjustment control 31. The gain of photomultiplier tube 11 (i.e., the amplitude of its electrical signal output for a given amount of light input) is adjusted in accordance with the magnitude of the voltage applied to gain control terminal 11c by high voltage power supply 30. In accordance with this aspect of the invention, manual control 31 is adjusted until meter 22 indicates an MTF reading of 100 percent for the low-frequency signal. After this adjustment is made, the MTF reading for the higher spatial frequencies may be made either with meter 22, using switch S, or with meters 23 and 23n, as discussed hereinabove.

More specifically, in the embodiment of the invention illustrated in FIG. 1, light source 5, slit reticle 8, and relay lenses 10 may be of any conventional construction suitable for projecting a line or "slit" image through optical device 1, the unit under test, and focusing it upon the plane of pattern wheel 12 and then projecting it onto the input screen 11a of photomultiplier tube 11. Similarly, photomultiplier 11 may also by of any conventional construction suitable for converting a given amount of light incident upon input screen 11a into a corresponding electrical output signal at its output section or terminal 11b at an amplitude which varies systematically in accordance with given control signals applied to gain control terminal 11c. A photomultiplier tube particularly adapted for this application of the invention is a model number 9524 manufactured by EMI, Inc. The gain control signal for this embodiment of the invention is in the form of a voltage developed by a conventional high-voltage power supply 30, the output of which is varied by a manual control 31 and applied to photomultiplier tube 11 at gain control terminal 11c.

The motor-driven pattern wheel 12 modulates the projected image to produce simultaneously a low-frequency image component and at least one higher-frequency image component which are incident upon the input screen 11a of photomultiplier tube 11. Pattern wheel 12 may be in the form of either a rotating disc or drum and the particular construction of pattern wheel 12 is discussed in greater detail hereinbelow with respect to FIGS. 2 and 6. The number of higher-frequency image components produced may be selected in accordance with the application for which the apparatus constructed in accordance with the invention is designed. For the MTF measurement of image intensifier tubes during routine production testing, for example, only three discrete spatial frequencies (e.g., 2.5, 7.5, and 15 line pairs/mm) typically need to be considered. Consequently, pattern wheel 12 need only produce simultaneously four image components for such an application of the invention: the low-frequency image component utilized to normalize the apparatus and three higher-frequency components corresponding to the three spatial frequencies of interest.

In response to the image components which are produced by pattern wheel 12 and projected upon input screen 11a, photomultiplier tube 11 develops a composite electrical signal which has a frequency spectrum representative of all of the thus-produced image components. A conventional preamplifier 15 is used to amplify the composite signal to a level suitable for application to filters 16, 17, and 17n. In the illustrated embodiment of the invention, a plurality of filters are employed which are respectively tuned to the frequency of each image component, although the separation of the composite signal into the various discrete component frequencies may be accomplished in various ways without departing from the principles of the invention.

An improved signal-to-noise ratio generally produces more stable and repeatable MTF measurements. To effectively enhance the signal-to-noise ratio of the separate signals, phase-locked-loop (PLL) detectors 18, 19, and 19n, which are of the type commonly available in integrated circuit form (e.g., Signetics Corporation No. 565) may be utilized in conjunction with filters 16, 17, and 17n respectively. Typically, each PLL detector is tuned to the center frequency of its respective filter by adjusting an internal voltage-controlled oscillator to that frequency. The detector then compares the signal applied to its input terminal with that of the internal oscillator and generates a DC error signal whose magnitude is a function of the phase and frequency differences between the two signals. PLL detector circuits 18, 19, and 19n also have a loop filter circuit, the bandwidth of which may be adjusted very narrowly to accept only the frequency of interest and develop a DC output signal whose magnitude systematically varies in accordance with the amplitude of that frequency. The outputs of detectors 18, 19 and 19n are respectively coupled to amplifiers 20, 21, and 21n which are employed to increase the magnitude of each DC detector signal to a level suitable for driving meters 22, 23, and 23n, respectively. As discussed above, after the gain of photomultiplier tube 11 is adjusted to obtain a 100 percent MTF reading by meter 22, for the low-frequency component, the MTF readings for the higher-frequency components may be made by meters 23 and 23n.

In accordance with one feature of the invention, a switch S and a single meter 22 may be used instead of separate meters 23 and 23n for each higher-frequency component. As shown in FIG. 1, switch S is operable to selectively connect the output of amplifiers 20, 21, and 21n to meter 22. In operation, switch S is used to connect the low-frequency signal from amplifier 20 to meter 22 and the gain of photomultiplier 11 is adjusted by means of high-voltage power supply 30 and manual control 31 until meter 22 indicates the predetermined amplitude of 100 percent MTF for the low-frequency image component. In accordance with this aspect of the invention, the system is thus normalized and switch S may be operated to its other positions to indicate the MTF measurements for the device under test at the various preselected higher spatial frequencies. Alternatively, separate meters 20, 21 and 21n may be directly connected to their respective amplifiers (as shown in FIG. 1 in dotted-line form for meters 21 and 21n) to indicate simultaneously the MTF measurements for the various frequencies of interest.

In accordance with another aspect of the invention, the projected image may be modulated by a substantially planar pattern wheel 12 in the form of a rotating disc rotationally driven by motor 13 and its shaft 13a at a predetermined speed (e.g., approximately 300 rpm). The plane of the disc 12 is essentially perpendicular to the image projection path. A pattern wheel constructed in accordance with this aspect of the invention is illustrated in greater detail in FIG. 2 wherein pattern wheel 12 comprises a rotating disc having three arcuate pattern bands 40, 50 and 60 disposed in a concentric relationship, with each band having a continuous series of alternately transparent and opaque areas of the same size and shape and the total number of areas representing the desired spatial frequency when pattern wheel 12 is rotated at its normal operating speed. Band 40, for example, has a continuous series of alternately transparent and opaque areas which is partially illustrated by areas 41–48, with areas 41, 43, 45, and 47 representing the transparent areas and areas 42, 44, 46, and 48 representing the opaque areas. The areas of band 40 are made relatively large in order to modulate the image at a low-frequency rate. Bands 50 and 60 are constructed in essentially the same fashion as band 40 except that they each have a progressively greater total number of areas of a correspondingly smaller size in order to modulate the image at higher frequencies. Bands 50 and 60 are represented in FIG. 2 by partial band pattern areas 51 and 61, respectively. Of course, in some applications of the invention, a fewer or greater number of bands may be employed in accordance with the number of spatial frequencies of interest.

The shape of the transparent and opaque areas in a band may be of any desired form; however, in accordance with another feature of the invention, they may preferably take the form of a trapezoid so that the modulating frequency of that band contains no third harmonic and very little higher harmonics which tend to adulterate the frequency spectrum of the corresponding image component. It is also relatively easy to construct the pattern wheel with the trapezoidal shape in that the straight-line artwork is relatively straightforward. In addition, it is preferable to select the total number of band areas such that the frequencies produced thereby are not odd multplies of each other in order to minimize the possibility of one frequency interfering with a higher frequency. Since the harmonic content is generally of little consequence for the highest two frequencies selected for the pattern wheel, however, the transparent/opaque pattern for the two highest frequencies if desired may be rectangular instead of trapezoidal because the harmonic relationship between them is not critical in most applications of the invention.

FIG. 3 illustrates the trapezoidal waveshape of the electrical signal corresponding to the low-frequency band 40 and FIG. 4 illustrates the "double-trapezoid" waveshape of the composite electrical signal corresponding to both the low-frequency image component and a higher-frequency band 50. It is apparent that the waveshape of the composite signal illustrated in FIG. 4 comprises the relatively high-frequency trapezoidal signal component produced by the modulator of the image by band 50 superimposed on the low-frequency trapezoidal signal component produced by the modulation of the image by band 40.

Figure 5:
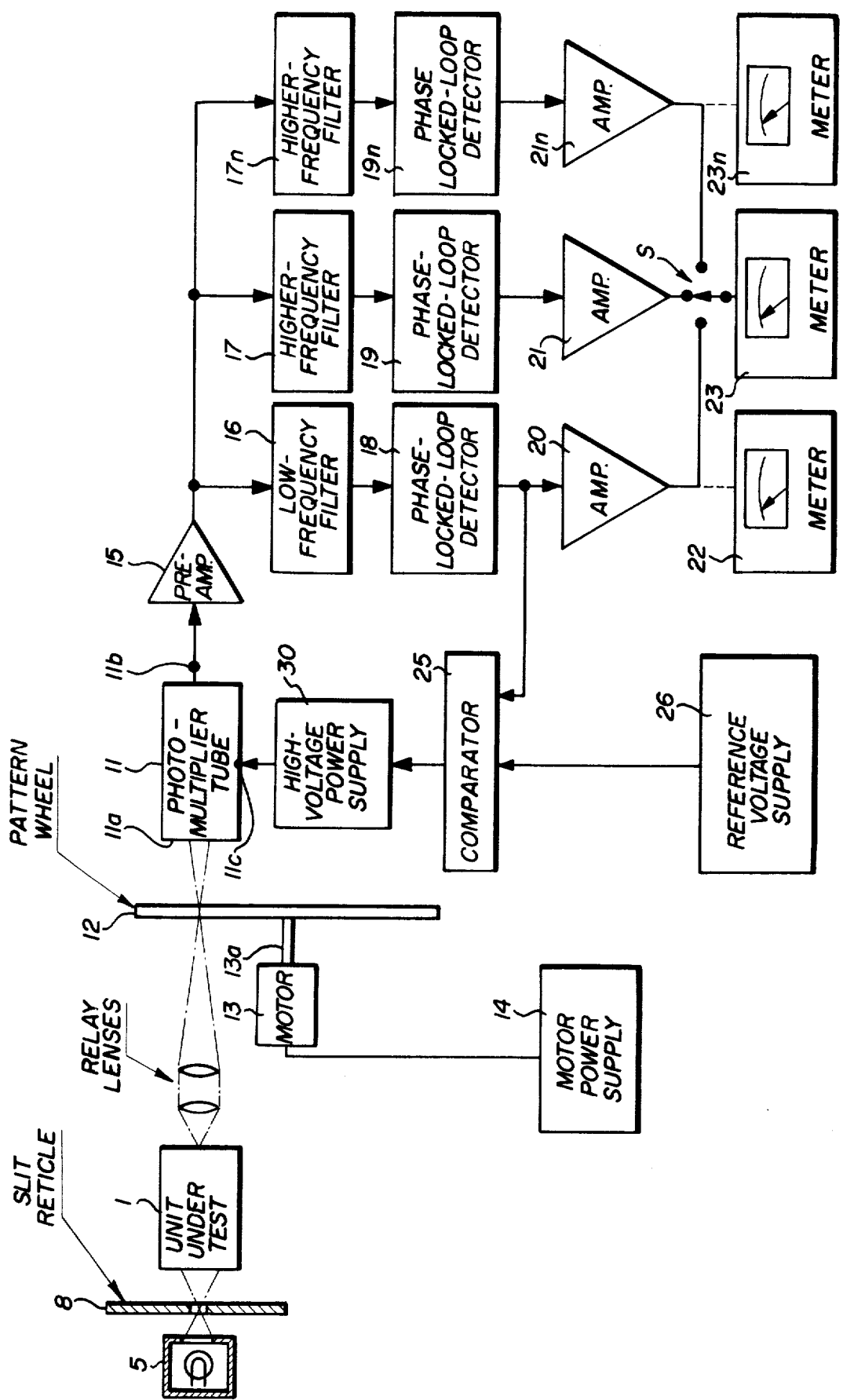
FIG. 5 is a block diagram of a preferred embodiment of the invention in which the normalization is accomplished automatically.

With respect to FIG. 5, there is shown an apparatus constructed in accordance with another aspect of the invention wherein the manual normalization of the embodiment of the invention ilustrated in FIG. 1 is replaced with an automatic normalization operation. Instead of manual control 31, comparator circuit 25 is coupled to both the DC output of phase-locked-loop detector 18 and to a reference voltage supply 26, with the output error or control signal of comparator 25 being applied to high-voltage power supply 30 which in turn controls the gain of photomultiplier tube 11. Comparator circuit 25 compares the magnitude of the DC signal from phase-locked-loop detector 18 with a preselected reference signal from reference voltage supply 26 to develop with corresponding control signal. The magnitude of the reference signal is selected to be equal to that developed by detector 18 which represents the amplitude of the low-frequency component corresponding to 100 percent MTF. The error signal from comparator 25 adjusts high-voltage power supply 30 in a manner which causes the gain of photomultiplier tube 11 to change until the amplitude of the output signal from detector 18 substantially equals that of the reference voltage supply 26. Thus, the system is automatically normalized and remains normalized throughout the period of testing the device 1. Accordingly, no meter is required for indicating the output of detector 18 although one may be employed if desired (the connection of meter 22 to amplifier 20 is thus shown in dashed-line form). Similar to the embodiment illustrated in FIG. 1, the embodiment illustrated in FIG. 5 may employ one meter 23 and a switch S as shown to select and read the desired amplifier output. Alternatively, and as in the embodiment illustrated in FIG. 1, the embodiment illustrated in FIG. 5 may employ separate meters for each frequency, and the connection of meter 23n to amplifier 21n is therefore shown in dashed-line form.

The automatic normalization embodiment of the invention has several significant advantages. One important advantage is that the operator of the device neither needs to be specially trained to normalize the system nor has to take the time to set up the system insofar as normalization is concerned. This is of considerable value in a production-line test facility where both time and labor costs are especially important. Another advantage is that the MTF measurements are more reliable because the system constructed in accordance with the invention automatically maintains proper normalization regardless of extraneous variations in the system due to variations in gain in various parts of the circuit or those caused by changes in the ambient light or changes in the level of light from the light source.

It should be noted that, although the illustrated embodiments of the invention utilize a variable-gain photomultiplier tube for effecting adjustment of the system to a normalized level, alternative means may be employed which vary the overall gain or signal level of the system. For example, a manual control similar to control 31 could be employed to vary the intensity of light source 5. This would in turn vary the amount of light signal incident upon the optical input screen of the photoelectric transducer and therefore the amplitude of the composite electrical output signal. Alternatively, an automatic control circuit utilizing means such as comparator circuit 25 and reference voltage source 26 could be employed to automatically adjust the intensity of light source 5 to effect an MTF reading of 100 percent for the low-frequency component.

Similarly, preamplifier 15 could comprise an amplifier having a variable gain characteristic which is uniform over the bandwidth of the frequencies of interest and systematically responsive to an externally-applied control signal. Amplifier 20, 21, and 21n could comprise amplifiers having identical gain characterisitics with respect to the frequencies of interest and systematically responsive to an externally-applied gain control signal which would be applied simultaneously to all three amplifiers. Of course, in both of these alternatives the gain control signal could be applied by manual or automatic means.

FIG. 6 is a block diagram of an alternative embodiment of the image-modulating means of the invention. In the embodiment illustrated in FIG. 6, the pattern wheel 12 of the embodiment illustrated in FIGS. 1 and 5 is implemented in the form of a drum 70 which is rotationally driven about an axis 80 by motor 13 and motor shaft 13a, which is shown in dashed-line form. The patterns on drum 70 may be in accordance with those discussed hereinabove or, in accordance with another aspect of the invention, they may be rectangular as illustrated in FIG. 7.

Figure 7:
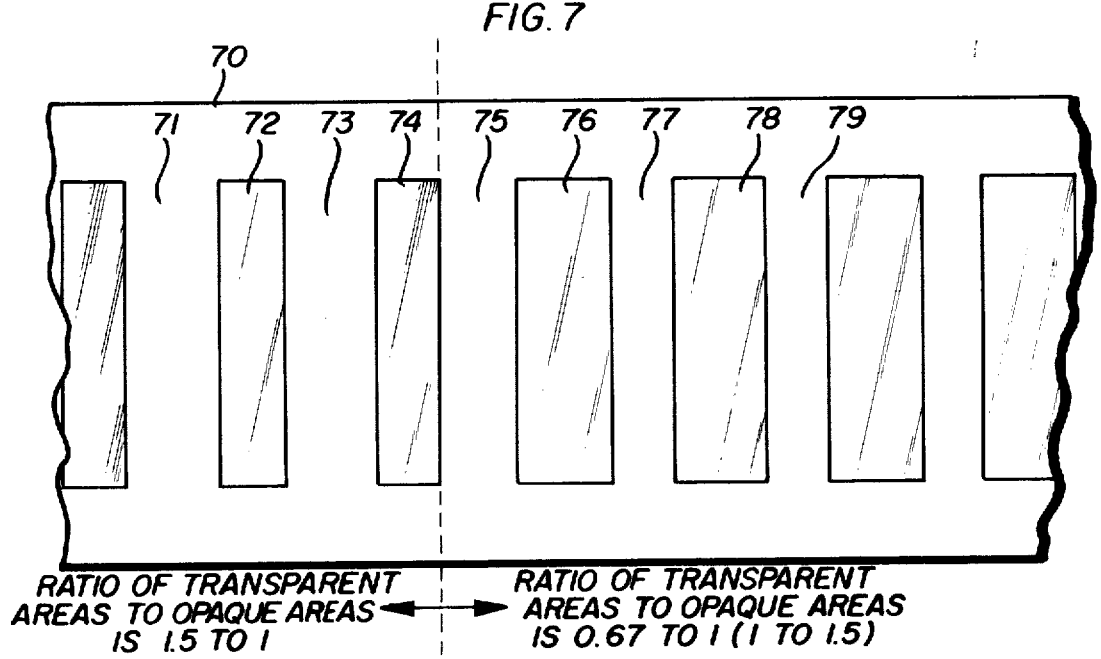
FIG. 7 illustrates a pattern which is employed in the modulating means of an alternative embodiment of the modulating means of the invention; and, FIGS. 8, 9, and 10 are graphical representations of signals developed by an alternative embodiment of the image-modulating pattern of the invention.

FIG. 7 illustrates a portion of drum 70 containing a corresponding portion of a continuous series of alternately transparent and opaque areas 71–79, with areas 71, 73, 75, 77, and 79 representing the opaque areas and areas 72, 74, 76, and 78 representing the transparent areas. In accordance with this aspect of the invention, a predetermined number of the transparent areas have an area which bears a predetermined first ratio relative to the area of a corresponding number of opaque areas and the remaining number of transparent areas have an area which bears a second ratio relative to the remaining number of opaque areas which is the inverse of the first ratio. As illustrated in FIG. 7, the first ratio may be 1.5 to 1; that is, opaque areas 71 and 73 each have an area which is 50 percent greater than transparent areas 72 and 74. The second or inverse ratio is therefore 0.67 to 1 (1 to 1.5) which means that transparent areas 76 and 78 each have an area which is 50 percent greater than opaque areas 75 and 77.

For the entire surface of drum 70, half of it has the transparent/opaque area ratio of 1.5 to 1 and the other half has the inverse transparent/opaque ratio of 1 to 1.5. When the drum is rotated at its normal operating speed the transition from individual transparent areas to adjacent opaque areas (e.g., 40 times per drum revolution) modulates the projected image to produce a relatively high-frequency image component, and the transition from the preselected ratio to its inverse (e.g., twice per drum revolution) modulates the projected image to produce the low-frequency image component which is utilized in accordance with the invention to normalize the system. The number of transparent and opaque areas, their relative ratios, the number of ratio transitions per drum revolution, and the rotational speed of the drum of course may be varied to adapt the apparatus of the invention to a particular application without departing from the principles of the invention.

Figure 8:
Figure 9:
Figure 10:
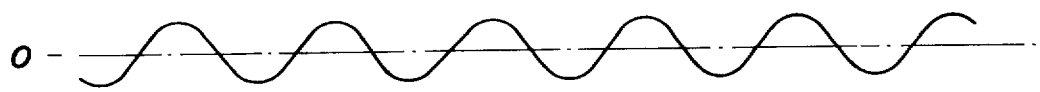

FIG. 8 illustrates the composite signal developed by photomultiplier tube 11 in response to the image modulated by the pattern drum just described with respect to FIG. 6 and incident upon input screen 11a of photomultipler tube 11. FIG. 9 represents the discrete electrical signal corresponding to the low-frequency image component (e.g., the waveform of FIG. 9 may be obtained by passing the waveform of FIG. 8 through a low-pass filter) and FIG. 10 illustrates that corresponding to the high-frequency component (e.g., the waveform of FIG. 10 may be obtained by passing that of FIG. 8 through a band-pass filter).

Thus there has been shown and described a new and improved system for measuring the modulation transfer function of an optical device which manually or automatically normalizes itself to obtain absolute MTF values at one or more spatial frequencies. While a particular embodiment of the invention has been shown and described, it will, of course, be understood that modifications of the present invention, in its various aspects, will be apparent to those skilled in the art, some being apparent only after study, and others being merely matters of routine design. As such, the scope of the invention should not be limited by the particular embodiment and specific construction herein described, but should be defined only by the appended claims, and equivalents thereof.

Various features of the invention are set forth in the following claims.

The invention is claimed as follows:

1. A system for determining the image-forming quality of an optical device by projecting an image through said device and measuring the relative amount of light transmitted therethrough at a plurality of spatial frequencies, with said system determinations being normalized automatically and continuously throughout the duration of the evaluation of the optical devices under test, said system comprising: photoelectric transducer means, including an optical input section and an electrical output section, for converting a light signal incident upon said input section into a corresponding electrical signal at said output section; means for projecting said image along a projection path through said optical device and onto said optical input section; means disposed in said projection path for modulating said projected image to produce simultaneously a low-frequency image component incident upon said optical input section and at least one higher-frequency image component incident upon said optical input section; a plurality of filter means respectively tuned to the frequency of each of said image component and coupled to the electrical output section of said photoelectric transducer means for developing a corresponding plurality of discrete electrical signals each representative of a different one of said image components; indicating means coupled to said filter means for indicating the amplitude of said discrete electrical signals; and means for adjusting said system to cause said indicating means to indicate a predetermined amplitude for said low-frequency image component, said adjusting means comprising means for comparing the amplitude of said discrete low-frequency signal with the amplitude of a preselected reference signal and generating an error signal which automatically adjusts said system to substantially equalize the amplitude of said reference signal and said low-frequency signal, whereby the system is automatically and continuously set to a normalized level for the optical device being measured during the evaluation of the optical device under test and with the higher-frequency image components then capable of being measured under a standardized system for determining the image-forming quality of a series of optical devices at one or more higher spatial frequencies.

2. A system in accordance with claim 1, in which said indicating means comprises a plurality of meters respectively coupled to said filter means for indicating the amplitudes of said discrete electrical signals.

3. A system in accordance with claim 1 in which said indicating means comprises a meter and switch means having an output terminal, with said meter coupled to said output terminal and said switch means coupled to said filter means, for selectively coupling one of said discrete electrical signals to said meter, whereby the system may be operated with a single meter by first making the low-frequency reading and adjusting the system to the predetermined amplitude for the low-frequency reading to thus normalize the apparatus, and then switching the meter to indicate the amplitude of a higher-frequency signal.

4. A system in accordance with claim 1, in which said photoelectric transducer means comprises a photomultiplier tube having a light input screen and an electrical output terminal for converting a given amount of light incident upon said input screen into a corresponding electrical signal at said output terminal at an amplitude which varies in accordance with an externally-applied control signal.

5. A system in accordance with claim 1, in which said image modulating means comprises a motor and a pattern wheel rotationally driven by said motor at a predetermined speed and including a continuous series of alternately transparent and opaque areas, with a predetermined number of said transparent areas having an area which bears a first ratio relative to the area of a corresponding number of said opaque areas and the remaining number of said transparent areas having an area which bears a second ratio relative to the remaining number of said opaque areas, said second ratio being the inverse of said first ratio, whereby the rotating pattern wheel modulates the projected image to produce simultaneously a low-frequency image component and a higher-frequency image component.

6. A system in accordance with claim 5, in which said predetermined ratio is 1.5 to 1.

7. A system in accordance with claim 1, in which said modulating means comprises a motor and a pattern wheel rotationally driven by said motor at a predetermined speed, said pattern wheel comprising a plurality of arcuate pattern bands disposed in a concentric relationship, with each said band having a continuous series of alternately transparent and opaque areas of substantially the same size and shape and the total number of said areas representing a predetermined spatial frequency at said rotational speed, whereby one of said bands modulates the image at a low-frequency rate and the other bands simultaneously modulate the image at preselected higher-frequency rates.

8. A system in accordance with claim 7, in which the shape of said transparent and opaque areas is trapezoidal.

9. A system in accordance with claim 1, in which said image component frequencies are related by even harmonics.

10. A system in accordance with claim 1, in which each said filter means includes a phase-locked-loop detector tuned to one of said image component frequencies and responsive to the electrical signal applied to said filter means for increasing the signal-to-noise ratio of said discrete electrical signal.

11. A system in accordance with claim 1, in which said photoelectric transducer means comprises a photomultiplier tube having a light input screen, an electrical output terminal, and a gain control terminal for converting a selected amount of light incident upon said input screen into a corresponding electrical signal at said output terminal at an amplitude which varies systematically in accordance with an externally-applied gain control signal applied to said gain control terminal; and in which said comparing means comprises a comparator circuit coupled between said filter means and said photomultiplier tube and responsive to said discrete low-frequency signal for comparing the amplitude of said discrete low-frequency signal with a predetermined reference signal amplitude and developing a corresponding error signal which is applied to said gain control terminal of said photomultiplier tube to adjust the amplitude of said electrical signal until the amplitude of said discrete low-frequency signal corresponds to the amplitude of said reference signal, whereby said system is automatically normalized.

12. A system for determining the image-forming quality of an optical device by projecting an image through said device and measuring the relative amount of light transmitted therethrough at a plurality of spatial frequencies, with said system determinations being normalized automatically and continuously throughout the duration of the evaluation of the optical device under test, said system comprising: photoelectric transducer means, including an optical input screen, an electrical output terminal, and a gain control terminal, for converting a light signal incident upon said input screen into a corresponding electrical signal at said output terminal at an amplitude which varies systematically in accordance with an externally-applied gain control signal applied to said gain control terminal; means for projecting said image along a path through said optical device and onto said optical input screen; means, including a motor and a pattern wheel rotationally driven by said motor at a predetermined speed, disposed in said projection path for modulating said projected image to produce simultaneously a low-frequency image component incident upon said optical input screen and at least one higher-frequency image component incident upon said optical input screen; a plurality of filter means respectively tuned to the frequency of each said image component and coupled to the electrical output section of said photoelectric transducer means for developing a corresponding plurality of discrete electrical signals each representative of a different one of said image components; indicating means coupled to said filter means for indicating the amplitude of said discrete electrical signals; means for generating said gain control signal; and means for adjusting said gain control signal generating means to cause said photoelectric transducer means to develop at said output terminal an electrical signal corresponding to said low-frequency image component at an amplitude which causes said indicating means to give a predetermined reading, said adjusting means comprising means for comparing the amplitude of said discrete low-frequency signal with the amplitude of a preselected reference signal and generating an error signal which is applied to said gain control terminal of said photoelectric transducer means to automatically adjust said system to substantially equalize the amplitude of said reference signal and said low-frequency signal, whereby the system is automatically and continuously set to a normalized level for the optical device being measured during the evaluation of the optical device under test and so that the higher-frequency image components are then capable of being measured under a standardized system for determining the image-forming quality of a series of optical devices at one or more spatial frequencies.

13. A system in accordance with claim 12, in which said indicating means comprises a plurality of meters respectively coupled to said filter means for indicating the amplitudes of said discrete electrical signals.

14. A system in accordance with claim 12, in which said indicating means comprises a meter and switch means having an output terminal, with said meter coupled to said switch means output terminal and said switch means coupled to said filter means, for selectively coupling any one of said discrete electrical signals to said meter, whereby the system may be operated with a single meter by first making the low-frequency reading and adjusting the gain of the photoelectric transducer to obtain the predetermined reading for the low-frequency image component, to thus normalize the apparatus, and then switching the meter to another filter to indicate the amplitude of a higher-frequency signal.

15. A system in accordance with claim 12, in which said photoelectric transducer means comprises a photomultiplier tube having a light input screen and an electrical output terminal for converting a selected amount of light incident upon said input screen into a corresponding electrical signal at said output terminal at an amplitude which varies systematically in accordance with said gain control signal.

16. A system in accordance with claim 12, in which said image modulating means comprises a motor and a pattern wheel rotationally driven by said motor at a predetermined speed comprising a continuous series of alternately transparent and opaque areas, with a predetermined number of said transparent areas having an area which bears a first ratio relative to the area of a corresponding number of said opaque areas and the remaining number of said transparent areas having an area which bears a second ratio relative to the remaining number of said opaque areas, said second ratio being the inverse of said first ratio, whereby the rotating pattern wheel modulates the projected image to produce simultaneously a low-frequency image component and a higher-frequency image component.

17. A system in accordance with claim 16, in which said preselected ratio is 1.5 to 1.

18. A system in accordance with claim 16, in which said predetermined number equals one-half of the total number of said areas.

19. A system in accordance with claim 12, in which said modulating means comprises a motor and a pattern wheel rotationally driven by said motor at a predetermined speed, said pattern wheel comprising a plurality of arcuate pattern bands disposed in a concentric relationship, with each said band having a continuous series of alternately transparent and opaque areas of the same size and shape and the total number of said areas representing a predetermined spatial frequency at said rotational speed, whereby one of said bands modulates the image at a low-frequency rate and the other bands simultaneously modulate the image at preselected higher-frequency rates.

20. A system in accordance with claim 19, in which the shape of said transparent and opaque areas is trapezoidal.

21. A system in accordance with claim 12, in which said image component frequencies are related by even harmonics.

22. A system in accordance with claim 12, in which each said filter means includes a phase-locked-loop detector tuned to a different one of said image component frequencies and responsive to the electrical signal applied to said filter means for increasing the signal-to-noise ratio of said discrete electrical signals.

23. A system in accordance with claim 12, in which said photoelectric transducer means comprises a photomultiplier tube having a light input screen, an electrical output terminal, and a gain control terminal for converting a selected amount of light incident upon said input screen into a corresponding electrical signal at said output terminal at an amplitude which varies systematically in accordance with said gain control signal; and said comparing means comprises a comparator circuit coupled between said filter means and said photomultiplier tube and responsive to said discrete low-frequency signal for comparing the amplitude of said discrete low-frequency signal with the amplitude of said preselected reference signal and developing a corresponding control signal which is applied to said gain control terminal of said photomultiplier tube to adjust the amplitude of said electrical signal until the amplitude of said discrete low-frequency signal is substantially equal to the amplitude of said reference signal, whereby said system is automatically normalized.

* * * * *